(12) United States Patent
Throop et al.

(10) Patent No.: US 8,478,731 B1
(45) Date of Patent: Jul. 2, 2013

(54) MANAGING COMPRESSION IN DATA STORAGE SYSTEMS

(75) Inventors: Dean D. Throop, Efland, NC (US);
Dennis T. Duprey, Raleigh, NC (US);
Karl M. Owen, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 92 days.

(21) Appl. No.: 12/751,455

(22) Filed: Mar. 31, 2010

(51) Int. Cl.
*G06F 7/00* (2006.01)

(52) U.S. Cl.
USPC .......................................................... 707/693

(58) Field of Classification Search
USPC .......................................... 707/693, 999.101
See application file for complete search history.

(56) References Cited

U.S. PATENT DOCUMENTS

| | | | | |
|---|---|---|---|---|
| 5,530,850 | A * | 6/1996 | Ford et al. ...................... | 707/813 |
| 7,043,686 | B1 * | 5/2006 | Maruyama et al. ........... | 715/242 |
| 7,895,242 | B2 * | 2/2011 | Ergan et al. .................... | 707/802 |
| 8,250,335 | B2 * | 8/2012 | Whyte et al. .................. | 711/209 |
| 2006/0181441 | A1 * | 8/2006 | Fallon ............................... | 341/87 |
| 2006/0206507 | A1 * | 9/2006 | Dahbour ....................... | 707/100 |
| 2007/0150690 | A1 * | 6/2007 | Chen et al. .................... | 711/170 |
| 2008/0005475 | A1 * | 1/2008 | Lubbers et al. ............... | 711/118 |
| 2008/0133456 | A1 * | 6/2008 | Richards et al. ................... | 707/2 |
| 2008/0162523 | A1 * | 7/2008 | Kraus et al. .................... | 707/101 |
| 2009/0043792 | A1 * | 2/2009 | Barsness et al. .............. | 707/101 |
| 2010/0228800 | A1 * | 9/2010 | Aston et al. .................... | 707/822 |
| 2010/0274983 | A1 * | 10/2010 | Murphy et al. ................ | 711/162 |

OTHER PUBLICATIONS

A 3-tier RAID storage system with RAID1, RAID5, and compressed RAID5 for Linux (2000) by K. Gopinath , N. Suresh , Kumar Pankaj Risbood Venue: In Proceedings of the FREENIX Track at the 2000 USENIX Annual Technical Conference.*
FAST to the FULLEST—Storagezilla. Dec. 8, 2009. http://storagezilla.typepad.com/storagezilla/2009/12/fast-to-the-fullest.html.*
IBM i Support: Software Technical Document : 16803317. Operating System Disk Balancing Support Aug. 22, 2003.*
Jen-Wei Hsieh , Tei-Wei Kuo , Li-Pin Chang, Efficient identification of hot date for flash memory storage systems, ACM Transactions on Storage (TOS), v.2 n.1, p. 22-40, Feb. 2006 [doi>10.1145/1138041.1138043].*
Dan Linstedt—Temperature of Data for RDBMS, and DW 2.0. Posted Aug. 20, 2006 5:12 AM. http://www.b-eye-network.com/blogs/linstedt/archives/2006/08/temperature_of.php.*

* cited by examiner

*Primary Examiner* — Robert Timblin
(74) *Attorney, Agent, or Firm* — Krishnendu Gupta; Jason A. Reyes

(57) ABSTRACT

A method is used in managing compression in data storage systems. A data temperature is determined for a set of data in a block-based data storage system. Based on the data temperature, data compression is applied to the set of data.

14 Claims, 16 Drawing Sheets

| SLICE_ID | 0_23 | 1_09 | 1_83 | 2_22 | 3_67 | 4_92 | 4_74 | 5_37 |
|---|---|---|---|---|---|---|---|---|
| CURRENT TEMP | H | H | M | C | M | H | C | H |
| OLD COMPRESSION LEVEL | FC | UC | SC | SC | SC | UC | SC | UC |
| NEW COMPRESSION LEVEL | UC | UC | FC | SC | FC | UC | SC | UC |

FIG. 4

| CANDIDATE LIST |||||
|---|---|---|---|---|
| SLICE_ID | SLICE_TEMP | CURRENT LEVEL | NEW LEVEL | ... |
| 0_08 | 97 | SC | UC | |
| 1_34 | 58 | SC | FC | |
| N_93 | 21 | UC | SC | |
| | | | | |
| 0_12 | 65 | SC | FC | |
| 1_75 | 99 | FC | UC | |
| N_27 | 87 | SC | UC | |
| N_65 | 85 | FC | UC | |
| 0_91 | 62 | SC | FC | |
| 0_34 | 21 | FC | SC | |
| | | | | |
| ... | | | | |
| 1_43 | 72 | UC | FC | |

FIG. 7

| LU 0 | | | | |
|---|---|---|---|---|
| SLICE_ID | SLICE_TEMP | CURRENT LEVEL | NEW LEVEL | ... |
| 0_08 | 97 | SC | UC | |
| 0_12 | 65 | SC | FC | |
| 0_91 | 62 | SC | FC | |
| | | | | |
| 0_34 | 21 | FC | SC | |
| | | | | |
| ... | | | | |

| LU 1 | | | | |
|---|---|---|---|---|
| SLICE_ID | SLICE_TEMP | CURRENT LEVEL | NEW LEVEL | ... |
| 1_75 | 99 | FC | UC | |
| 1_43 | 72 | UC | FC | |
| 1_34 | 58 | SC | FC | |
| ... | | | | |

| LU N | | | | |
|---|---|---|---|---|
| SLICE_ID | SLICE_TEMP | CURRENT LEVEL | NEW LEVEL | ... |
| N_27 | 87 | SC | UC | |
| N_65 | 85 | FC | UC | |
| N_93 | 21 | UC | SC | |
| ... | | | | |

FIG. 8

| EXECUTION LIST | | | | |
|---|---|---|---|---|
| SLICE_ID | SLICE_TEMP | CURRENT LEVEL | NEW LEVEL | ... |
| 0_08 | 97 | SC | UC | |
| 1_75 | 99 | FC | UC | |
| N_27 | 87 | SC | UC | |

| LU 0 | | | | |
|---|---|---|---|---|
| SLICE_ID | SLICE_TEMP | CURRENT LEVEL | NEW LEVEL | ... |
| 0_12 | 65 | SC | FC | |
| 0_91 | 62 | SC | | |
| | | | | |
| 0_34 | 21 | FC | SC | |
| | | | | |
| ... | | | | |

| LU 1 | | | | |
|---|---|---|---|---|
| SLICE_ID | SLICE_TEMP | CURRENT LEVEL | NEW LEVEL | ... |
| 1_43 | 72 | UC | FC | |
| 1_34 | 58 | SC | FC | |
| ... | | | | |

| LU N | | | | |
|---|---|---|---|---|
| SLICE_ID | SLICE_TEMP | CURRENT LEVEL | NEW LEVEL | ... |
| N_65 | 85 | FC | UC | |
| N_93 | 21 | UC | SC | |
| ... | | | | |

FIG. 9

MANAGING COMPRESSION IN DATA STORAGE SYSTEMS

BACKGROUND

1. Technical Field

This application relates to managing compression in data storage systems.

2. Description of Related Art

A traditional storage array (which may also be referred to herein as a "disk storage array", "disk array", "storage system", or simply "array") is a collection of hard disk drives operating together logically as a unified storage device. Storage arrays are designed to store large quantities of data. Storage arrays typically include one or more storage array processors (SPs), for handling both requests for allocation and input/output (I/O) requests. An SP is the controller for and primary interface to the storage array.

Host computers (which may also be referred to herein as "hosts", "server computers", or simply "servers") may access data by sending access requests to the one or more storage arrays. Some storage arrays require that the access requests identify units of data to be accessed using logical volume ("LUN" or "LU") and block addresses that define where the units of data are stored on the storage array. Such storage arrays are known as "block I/O" storage arrays. In some block I/O storage arrays, the logical volumes presented by the storage array to the host correspond directly to physical storage devices (e.g., disk drives) on the storage array, so that the specification of a logical volume and block address specifies where the data is physically stored within the storage array. In other block I/O storage arrays (referred to as intelligent storage arrays), internal mapping techniques may be employed so that the logical volumes presented by the storage array do not necessarily map in a one-to-one manner to physical storage devices within the storage array. Nevertheless, the specification of a logical volume and a block address used with an intelligent storage array specifies where associated content is logically stored within the storage array, and from the perspective of devices outside of the storage array (e.g., a host) is perceived as specifying where the data is physically stored.

The block I/O storage array keeps track of the logical unit to physical unit associations in a map. The map associates a host logical unit address with a physical device address. The size of the elements in the map is the coarseness of the map. A map that only has a few entries of large extents is a course grain map. A map that has many entries with small extents is a fine grain map. A fine grain map allows more flexibility but generally is too large for all of it to be contained in memory at once. It is possible to use different mapping granularities for different data to achieve a variety of space/performance trade offs.

Performance of a storage array may be characterized typically by the array's total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

Thin provisioning is a mechanism that applies to large-scale centralized computer disk storage systems, storage area networks (SANs), and storage virtualization systems. Thin provisioning allows space to be easily allocated to servers, on a just-enough and just-in-time basis. The term thin-provisioning is used in contrast to fat provisioning that refers to traditional allocation methods on storage arrays where large pools of storage capacity are allocated to individual applications, but remain unused.

For example, in a storage consolidation environment, where many applications are sharing access to the same storage array, thin provisioning may allow administrators to maintain a single free space buffer pool to service the data growth requirements of all applications. With thin provisioning, storage capacity utilization efficiency can be automatically increased without heavy administrative overhead. Organizations can purchase less storage capacity up front, defer storage capacity upgrades in line with actual business usage, and save the operating costs associated with keeping unused disk capacity spinning.

Thin provisioning enables over-allocation or over-subscription. Over-allocation or over-subscription is a mechanism that allows server applications to be allocated more storage capacity than has been physically reserved on the storage array itself. This allows flexibility in growth and shrinkage of application storage volumes, without having to predict accurately how much a volume will grow or contract. Physical storage capacity on the array is only dedicated when data is actually written by the application, not when the storage volume is initially allocated.

The thin provisioning technology reduces the waste of storage capacity by preventing allocation of storage capacity to an unwritten data area.

Data processed by a computer such as a server typically has various levels of information content. Even within a single file, many data types and formats may be utilized. Each data representation has a specific meaning and each may hold differing quantities of information. Within the current art, computers process data in a native, uncompressed, format. Thus compressed data must often be decompressed prior to performing various data processing functions or operations.

Several solutions exist within the current art including file by file and block structured compressed data management.

In file by file compression, each file is compressed when stored on disk and decompressed when retrieved. For very small files this technique is often adequate, however for larger files the compression and decompression times can be too slow, resulting in inadequate system level performance. One advantage to file by file compression techniques is that they are easy to develop and are compatible with existing file systems.

Block structured disk compression operates by compressing and decompressing fixed block sizes of data. A group of blocks is compressed and decompressed as a unit. Most compression processes achieve a higher level of effectiveness when operating on larger quantities of data. Restated, the larger the quantity of data processed with a uniform information density, the higher the compressions ratio achieved.

Another advantage of block-based compression is that a storage array can perform the compression without server resources being consumed. For example, the array can perform the compression on a LUN while the server is doing other work or while no server is connected to the LUN (e.g., an archive LUN or a template LUN). Block-based compression can also be used with raw blocks of a LUN without a file system.

With respect to compression itself, there are a variety of data compression processes that are currently available. Many compression processes define one or more parameters that can be varied, either dynamically or a-priori, to change the performance characteristics of the process. For example, with a typical dictionary based compression process such as Lempel-Ziv, the size of the dictionary can affect the performance of the process. Indeed, a large dictionary may be employed to yield very good compression ratios but the process may take a long time to execute; this is an example of "slow compression", which emphasizes a high compression ratio over compression speed. If compression speed is more important than a high compression ratio, the process can be limited by selecting a smaller dictionary, thereby obtaining a much faster compression time, but at the possible cost of a lower compression ratio; this is an example of "fast compression", which emphasizes compression speed over a high compression ratio. The desired performance of a compression process and the system in which the data compression is employed, will vary depending on the application.

Thus, one challenge in employing data compression for a given application or system is selecting one or more optimal compression processes from the variety of available processes. Indeed, the desired balance between speed and efficiency is typically a significant factor that is considered in determining which process to employ for a given set of data. Processes that compress particularly well usually take longer to execute whereas processes that execute quickly usually do not compress particularly well.

SUMMARY OF THE INVENTION

A method is used in managing compression in data storage systems. A data temperature is determined for a set of data in a block-based data storage system. Based on the data temperature, data compression is applied to the set of data.

BRIEF DESCRIPTION OF THE DRAWINGS

Features and advantages of the present invention will become more apparent from the following detailed description of exemplary embodiments thereof taken in conjunction with the accompanying drawings in which:

FIGS. 4, 7-9 illustrate examples of data structures for use with one or more of the embodiments of FIGS. 1, 3, 11-16;

DETAILED DESCRIPTION OF EMBODIMENT(S)

Described below is a technique for use in managing compression in data storage systems, which technique may be used to provide, among other things, a system in which data's level of data access activity ("data temperature"), e.g., from data utilization statistics, is used to help prioritize compression in data storage systems. Conventionally, using compression processes in data storage systems allows more data to be stored without increasing the amount of physical media (e.g., hard disks) required, but performing the compression introduces delays which degrades the performance of LUNs that utilize compression. By contrast, the technique as described herein can be used to help create a mechanism to reduce or minimize such a performance impact by using data temperature, so that, for example, fast compression or no compression may be used for often accessed data ("hot data") while slow compression is used for infrequently accessed data ("cold data"). In at least some cases, such a mechanism requires keeping data access statistics on sub LUN extents and using such statistics to rank data from most frequently accessed ("hottest") to less frequently accessed ("coldest"). In at least one example implementation, such a ranking is consulted and the compression process is used only with cold data while hot data is not compressed.

In general, conventional approaches compress all of the data in a LUN without regard to data access frequency, which causes performance delays on all references or accesses. By contrast, in accordance with the technique as described herein, data temperature is used for example to help avoid compressing hot data, which means many frequent accesses are able to reference uncompressed data which is faster and higher performance than if that data were compressed and needed to be decompressed to be made sufficiently accessible.

Figure 1:
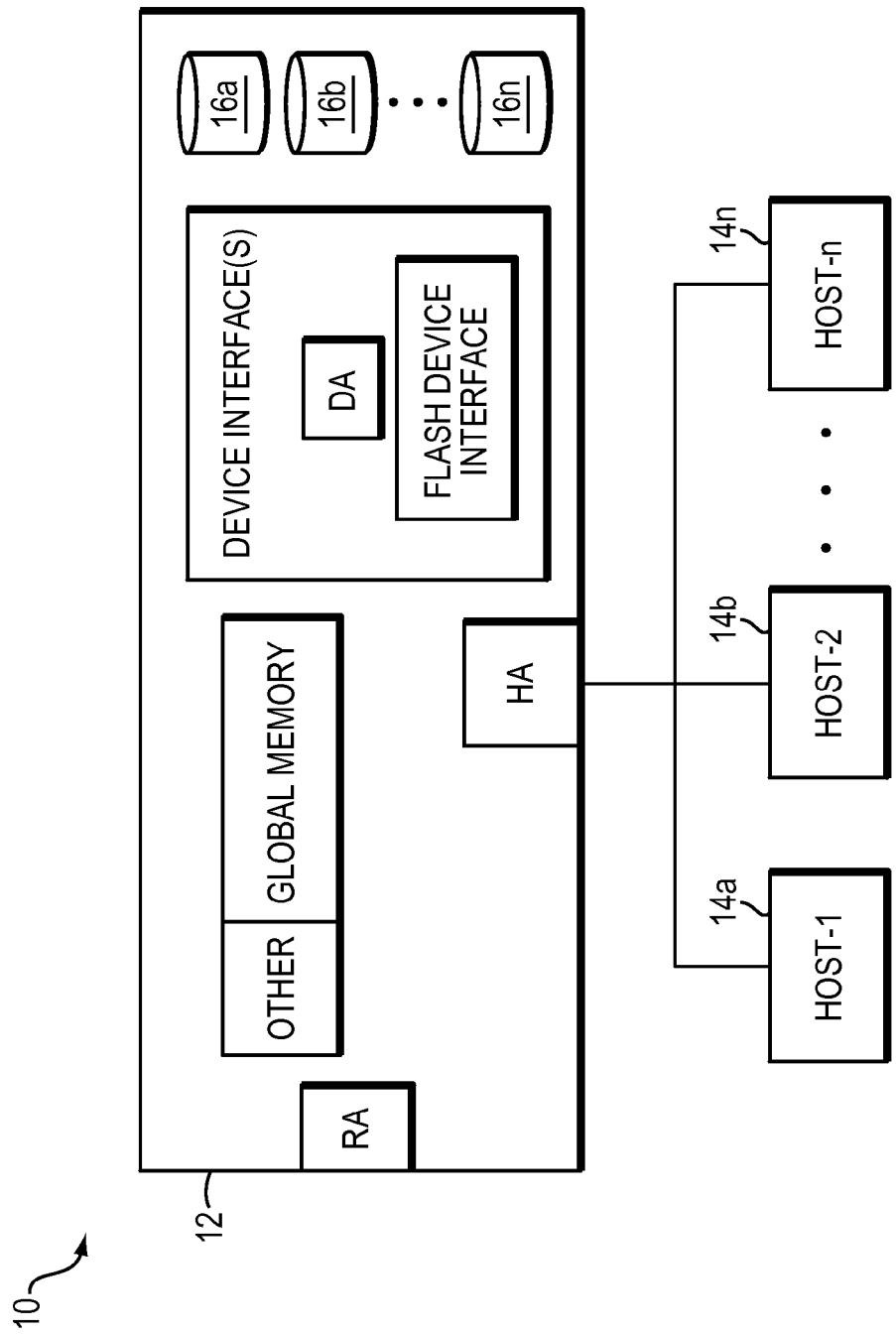
FIGS. 1, 3, 11-16 are examples of embodiments of a system that may utilize the techniques described herein.

Referring to FIG. 1, shown is an example of an embodiment of a system that may be used in connection with performing one or more implementations of the technique described herein. The system 10 includes an array (data storage system) 12 connected to host systems 14a-14n through a communication medium. In this embodiment of the computer system 10, the n hosts 14a-14n may access the array 12, for example, in performing input/output (I/O) operations or data requests. The communication medium may be any one or more of a variety of networks or other type of communication connections as known to those skilled in the art. The communication medium may be a network connection, bus, and/or other type of data link, such as a hardwire or other connections known in the art. For example, the communication medium may be the Internet, an intranet, network (including a Storage Area Network (SAN)) or other wireless or other hardwired connection(s) by which the host systems 14a-14n may access and communicate with the array 12, and may also communicate with other components included in the system 10.

Each of the host systems 14a-14n and the array 12 included in the system 10 may be connected to the communication medium by any one of a variety of connections as may be provided and supported in accordance with the type of communication medium. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the array 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel (FC), iSCSI, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the array 12 to perform a data operation. For example, an application executing on one of the host computers 14a-14n may perform a read or write operation resulting in one or more data requests to the array 12.

It should be noted that although element 12 is illustrated as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The array 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment. Other configurations may used other storage arrays to physical storage for a storage array.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical units (LUNs as described above). The LUNs may or may not correspond to the actual physical devices or drives 16a-16n. For example, one or more LUNs may reside on a single physical drive or multiple drives, or a variety of subsets of multiple drives. Data in a single data storage system, such as a single data storage array, may be accessed by multiple hosts allowing the hosts to share the data residing therein. The map kept by the storage array may associate host system logical address with physical device address.

As described above, the array 12 may be a data storage array including a plurality of data storage devices 16a-16n of which none or one or more of the devices 16a-16n may be flash memory devices employing one or more different flash memory technologies. In one embodiment, the array 12 may be a Symmetrix® DMX™ data storage array and/or a CLARiiON® data storage array by EMC Corporation of Hopkinton, Mass. In the foregoing data storage array, the data storage devices 16a-16n may include only disk devices or only flash devices or a combination of disk devices and flash devices in which the flash devices may appear as standard Fibre Channel drives to the various software tools used in connection with the data storage array. The disk devices may be any one or more different types of disk devices such as, for example, an ATA disk drive, FC disk drive, and the like. The flash devices may be constructed using different types of memory technologies such as nonvolatile semiconductor NAND flash memory forming one or more SLC (single level cell) devices and/or MLC (multi level cell) devices. Additionally, flash memory devices and disk devices are two exemplary types of devices that may be included in a data storage system used in connection with the techniques described herein.

Figure 2:
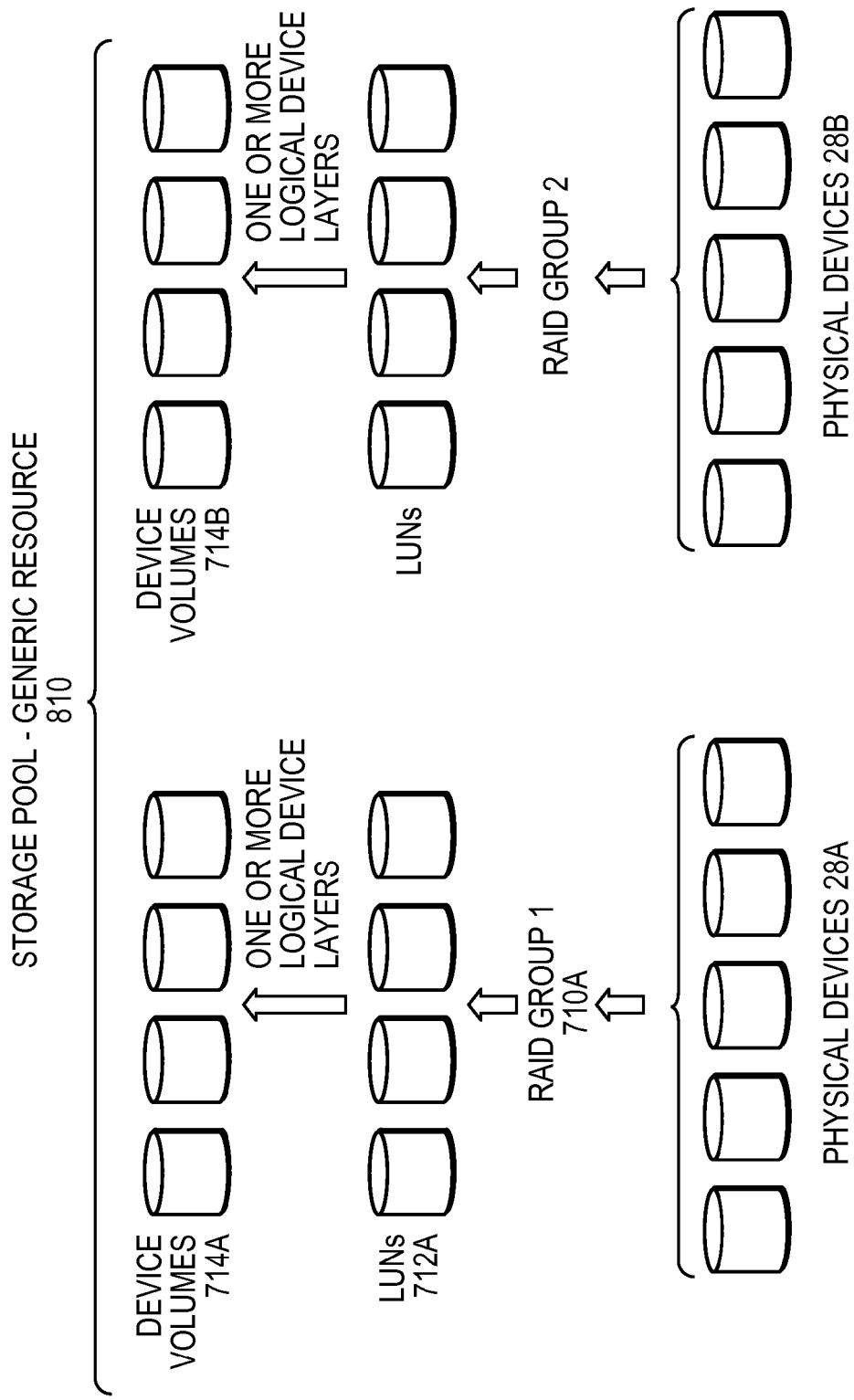
FIG. 2 illustrates example physical and logical components for use with one or more of the embodiments of FIGS. 1, 3, 11-16.

FIG. 2 illustrates an example representing how array 12 may construct storage pools from groups of physical devices such as devices 16a-16n. For example, RAID Group 1 710A may be formed from physical devices 28A which may include devices 16a-16n. The data storage system best practices of a policy may specify the particular RAID level and configuration for the type of storage pool being formed. For example, for physical devices 28A on a first data storage system type when forming a high performance storage pool, RAID-5 may be used in a 4+1 configuration (e.g., 4 data drives and 1 parity drive). The RAID Group 1 710A may provide a number of LUNs 712A. An embodiment may also utilize one or more additional logical device layers on top of the LUNs 712A to form one or more logical device volumes 714A. The particular additional logical device layers used, if any, may vary with the data storage system. It should be noted that there may not be a 1:1 correspondence between the LUNs of 712A and the volumes of 714A. In a similar manner, device volumes 714B may be formed or configured from physical devices 28B. Storage pool 810 of the example in FIG. 2 illustrates two RAID groups being used to define a single storage pool although, more generally, one or more RAID groups may be used for form a storage pool in an embodiment using RAID technology.

The data storage system best practices may define how to configure or form the generic storage pools, each storage pool having an associated generic storage pool type. FIG. 2 illustrates one methodology or framework that may be used to form storage pools in an embodiment. In an embodiment following the methodology of FIG. 2, each underlying data storage system such as array 12 may have associated best practices specifying how to configure storage pools formed from physical devices in that particular data storage system.

The storage pools may be used for one or more of multiple purposes, including, for example, for a thin provisioning program or driver (also referred to as a mapped LUN driver), not shown, to provide a volume realized by thin provisioning (thin provisioning volume: TPLU) to the host computer 14a. The TPLU is recognized as a volume having a virtual capacity larger than a capacity of the storage areas actually assigned to the TPLU. Upon reception of a write request to the TPLU, the thin provisioning program assigns an unused storage area of a storage pool 810 to the TPLU requested for data write in page units. It should be noted that the storage pool is composed of storage areas that can be assigned to the TPLUs. In addition, the unused storage area of the storage pool is a storage area that is not yet assigned to any of the TPLUs among all the storage areas included in the storage pool. Further, a page refers to a smallest unit of the storage area that is assigned to the TPLU, for example, a storage area of 8 Kbytes or 64 Kbytes.

As described below, use of the technique described herein can improve performance and cost effectiveness in the use of storage pools and slices thereof, and helps enable an optimization or improvement for compression capability to make it more useful while minimizing or reducing some of its negative aspects.

Compression in array 12 can increase the system's effective capacity by using software processes to help eliminate or reduce excess space in data so the same amount of data can be stored using less physical disk space. Where applied, compression reduces the physical storage needed but it but also decreases performance because of the time needed to compress and uncompress data. In such a case, when an I/O request is handled by the array, it may need to read data that has been compressed, in which case the data must be uncompressed by the data storage system before it can be delivered to satisfy the read. Such decompression takes time, so the I/O request to the array takes longer when the data is compressed.

If an array receives data to be stored and at some point attempts to compress the data, the work spent compressing the data must be undone when the data is used again, which consumes time and resources. Conventionally, it is difficult or impossible to predict or determine whether the data will be used again soon, to help avoid using resources to compress and uncompress the data without much benefit while delaying reads of the data. A strategy of the technique described herein is to base the decision on when to compress the data on usage patterns of the data so that, for example, hot data is less likely to be compressed and cold data is usually compressed.

Figure 3:
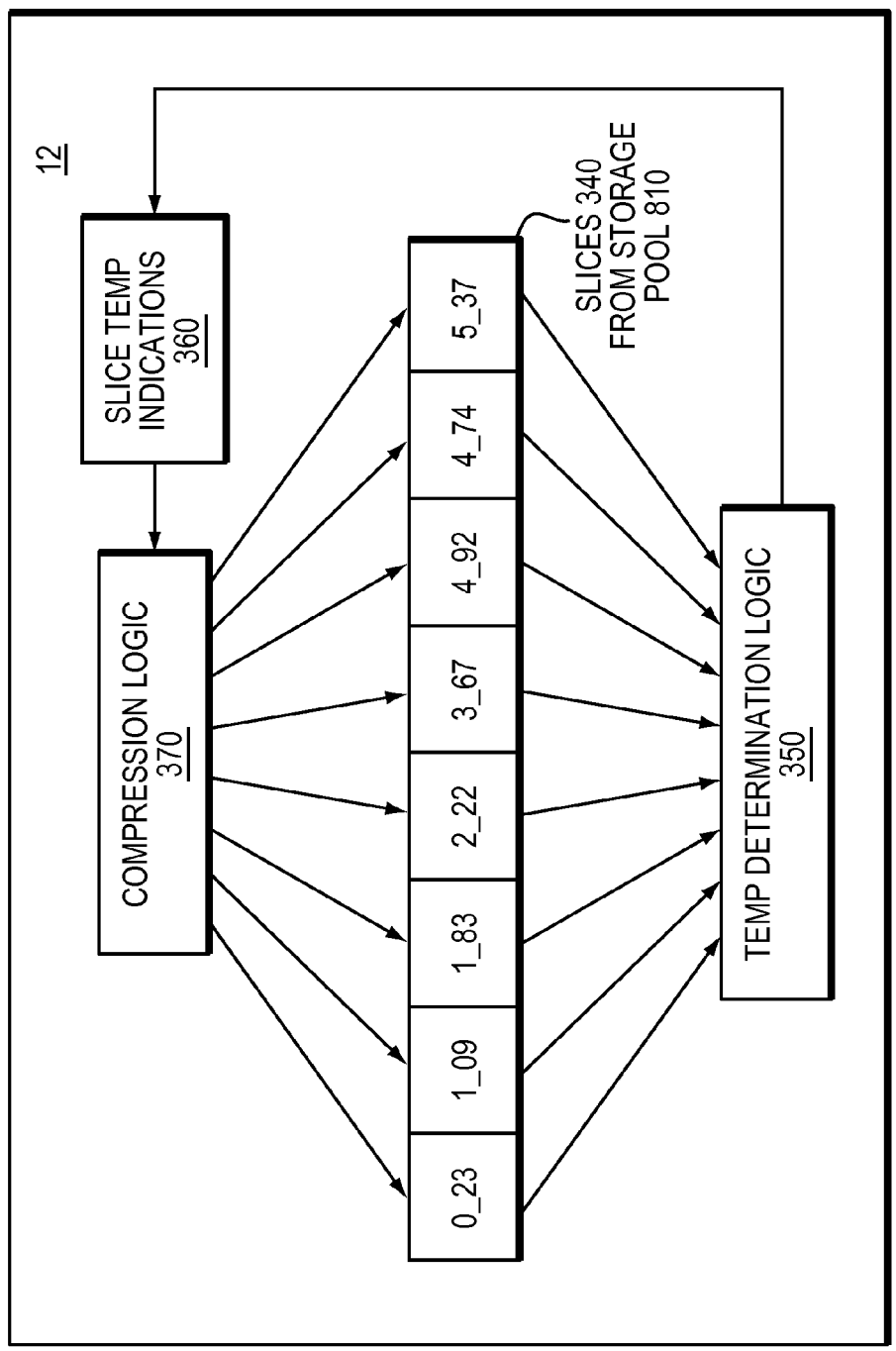

With reference now to FIG. 3, to help identify hot data, the array uses temperature determination logic 350 which, in at least one implementation, relies on the array keeping data usage statistics with the expectation that past usage patterns predict future usage. There are a variety of techniques for keeping data usage statistics. For example, as shown, the data of the storage pool may be subdivided into slices 340 (also referred to as buckets) and a statistic is kept for each slice. (Some implementations may have buckets within buckets as there can be saving in space needed to hold the statistics when using buckets of different sizes.)

To guide compression of data by compression logic 370, the data usage statistics may be used to create slice temperature indications 360 which can be used to rank data from hottest to coldest. In at least one implementation, a compression cut off temperature representing a threshold between hot and cold is used to determine which data is to be compressed and which data is not to be compressed. Data that is at least as hot as the cut off temperature is not compressed, and data colder than the cut off temperature is compressed. Multiple cut off temperatures may be used for separating different compression types, e.g., one cut off for complex compression, another cut off for light compression, and then no compression.

Figure 10:
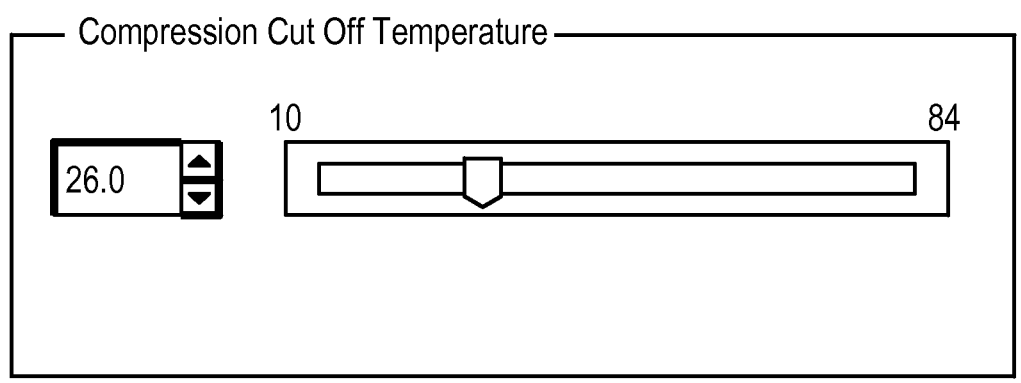
FIG. 10 illustrate an example of user interface functionality for use with one or more of the embodiments of FIGS. 1, 3, 11-16.

Depending on the implementation, the cutoff temperature can be expressed as a percentage and system administrators can manually adjust the cut off temperatures for LUNs in advanced mode as illustrated by example in FIG. 10. The array may offer an automatic mode instead or as well in which the array automatically selects a cut off temperature that balances response time with effectiveness of compression. In some implementations the array can also coordinate the cut off temperature with, or base it on, other factors such as quality of service (QoS) performance policies and controls.

In at least one implementation, data usage statistics can be collected on every I/O operation and occasionally the data temperature statistics collected are used to compute a temperature range and a current temperature for data. Statistics can be collected on a large subset of data and may include separate collection for particularly hot or particularly cold subsets of a larger set. This hierarchical collection can have several levels.

For example, compression logic 370 can walk through the data of a LUN in slices and determine from indications 360 whether a particular slice is above or below the cut off threshold and thus decide whether or not to compress that slice. Alternatively, temperature determination logic 350 and/or indications 360 can drive or support generation a set of segment identifiers for data that is, or is not, above or below the compression cutoff threshold; logic 370 can act on those segment identifiers to compress or uncompress such data as appropriate. Temperature determination logic 350 and/or indications 360 can generate the segment identifiers in priority order so that the coldest segments are returned first and thus are the first segments to be compressed.

In general, the technique can be used to help prevent hot data from being compressed so that the many or most I/O performs quickly while much or most of the cold data is compressed so substantial space can, potentially, be saved on the array.

In another example, with reference now to FIG. 4 together with FIG. 3, the current temperature of each slice may be categorized as hot (H), medium (M), or cold (C), and logic 370 may use such categorization to update each slice's compression level to uncompressed (UC), fast compression (FC), or slow compression (SC), respectively. For instance, slice 3_67 (i.e., slice 67 of LUN 3) has a current temperature of M and therefore its compression level is updated by logic 370 to FC.

More particularly, SC, FC, and UC have progressively increasing performance characteristics such that FC has a greater performance profile than SC, and UC has a greater performance profile than FC. A person having ordinary skill in the art will appreciate that the number of logical slices that can be included within a storage pool is virtually limitless. In one embodiment, each logical slice corresponds to one gigabyte of data. A person having ordinary skill in the art will appreciate, however, that slices can have virtually any size, ranging from very small to very large. In the illustrated embodiment of FIGS. 3-4, each block in the map represents one logical slice. As noted briefly above, blocks labeled "H" represent slices that are "hot," meaning they have a high temperature value and therefore correspond to data that is relatively frequently accessed. Blocks labeled "C" represent slices that are "cold," meaning they have a low temperature value and therefore correspond to data that is relatively infrequently accessed. Blocks labeled "M" represent slices that are "medium," meaning they have a middle-range temperature value and therefore correspond to data that is accessed more frequently than cold slices, but less frequently than hot slices.

Users of the storage pool of FIG. 4 benefit from the compression update operation, since the current compression levels of data within the pool is non-optimal. For example, slices 1_83 and 3_67 have medium current temperatures but are using slow compression instead of fast compression. Also, slice 0_23 has a high current temperature but is compressed instead of uncompressed. Such a configuration can be wasteful of storage pool performance capability, since slow compression is being used for data that is accessed at a medium activity rate, and compression is being used for data that is accessed at a high activity rate. Updating the compression levels of such slices can advantageously increase the performance of the storage pool as a whole.

Figure 5:
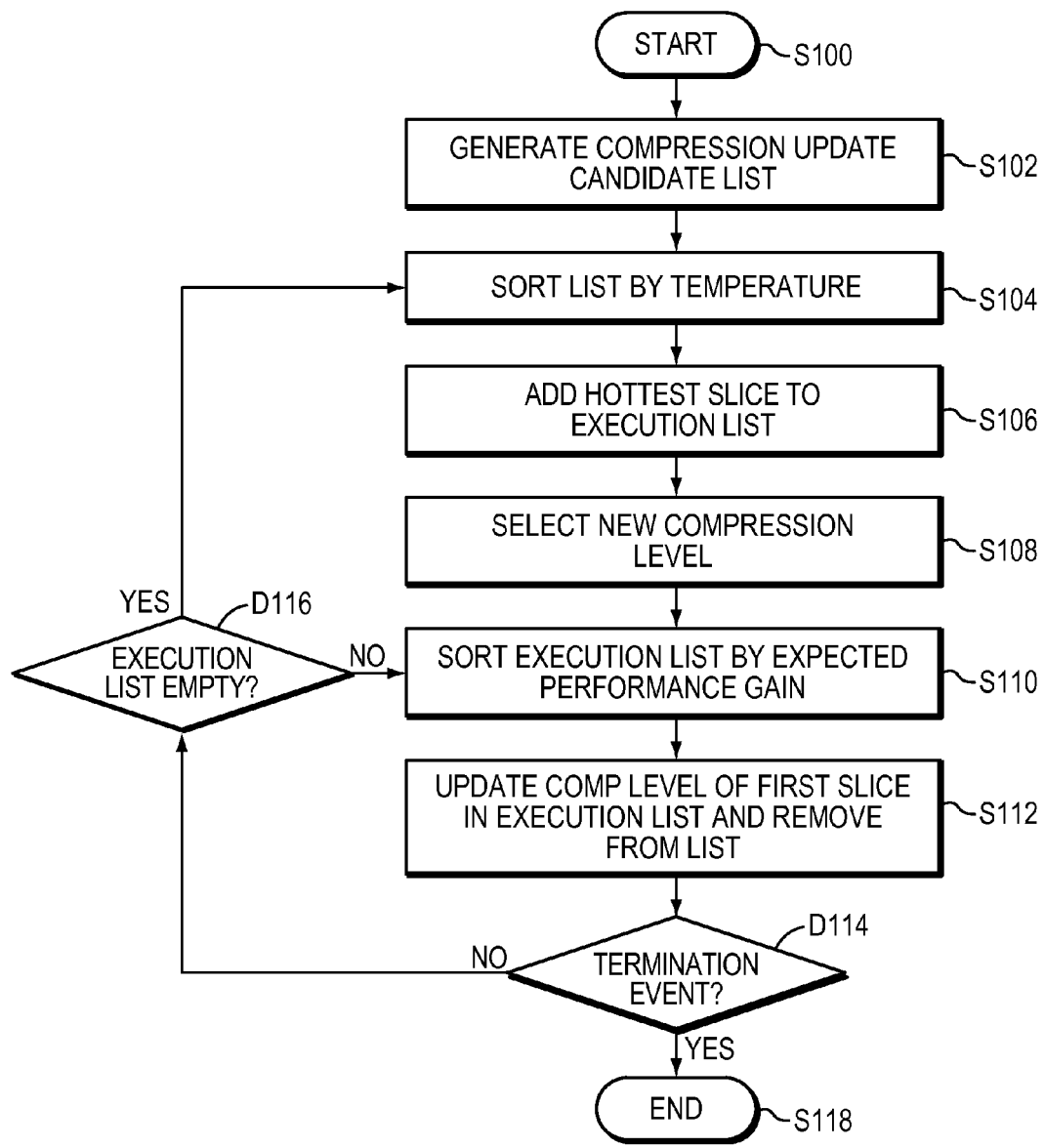
FIGS. 5-6 illustrate examples of processes for use with one or more of the embodiments of FIGS. 1, 3, 11-16.

One exemplary method for achieving compression level update similar to that shown in FIG. 4 is illustrated in FIG. 5. While various methods disclosed herein are shown in relation to a flowchart or flowcharts, it should be noted that any ordering of method steps implied by such flowcharts or the description thereof is not to be construed as limiting the method to performing the steps in that order. Rather, the various steps of each of the methods disclosed herein can be performed in any of a variety of sequences. In addition, as the illustrated flowcharts are merely exemplary embodiments, various other methods that include additional steps or include fewer steps than illustrated are also within the scope of the present invention.

As shown, the method can begin with a step S100. The method can be initiated manually by a user, for example by entering a command in a command-line-interface or by clicking on a button or other object in a graphical user interface (GUI). The method can also be initiated automatically by storage management software and/or can be scheduled to run automatically at certain dates and times. In one embodiment, a storage system can be configured to execute the method of FIG. 5 for a pre-determined number seconds, minutes, etc. during some off-peak period in which the storage system is typically at its lightest I/O load. Execution of the method can also be based on various user-specified constraints. For example, a user can specify that only one-thousand slice compression level updates should be executed in a single session, or that only 60 minutes should be spent update slice compression levels. A user can also specify that only one slice of each logical unit can have a compression level update in a single session or that the compression levels of certain logical units or slices should never be updated. A user can also "throttle" compression level update activity, for example by specifying a certain maximum amount of system bandwidth that can be used for performing compression level updates.

The method can further include a step S102 in which a "compression update candidate list" is generated. The candidate list can include an entry for each slice in the storage pool along with various properties of each slice. For example, each slice in the list can have a slice identifier, a current compression level, a slice temperature, and/or various other properties. The slice identifier can be a number, character string, or any other data structure or label or combination thereof for uniquely referring to a particular slice. The current compression level of each slice can likewise be represented by a number, a character string, etc. for identifying the compression level the data represented by the slice is presently using. For example, the current compression level of a slice can be uncompressed, fast compression, or slow compression.

Figure 6:
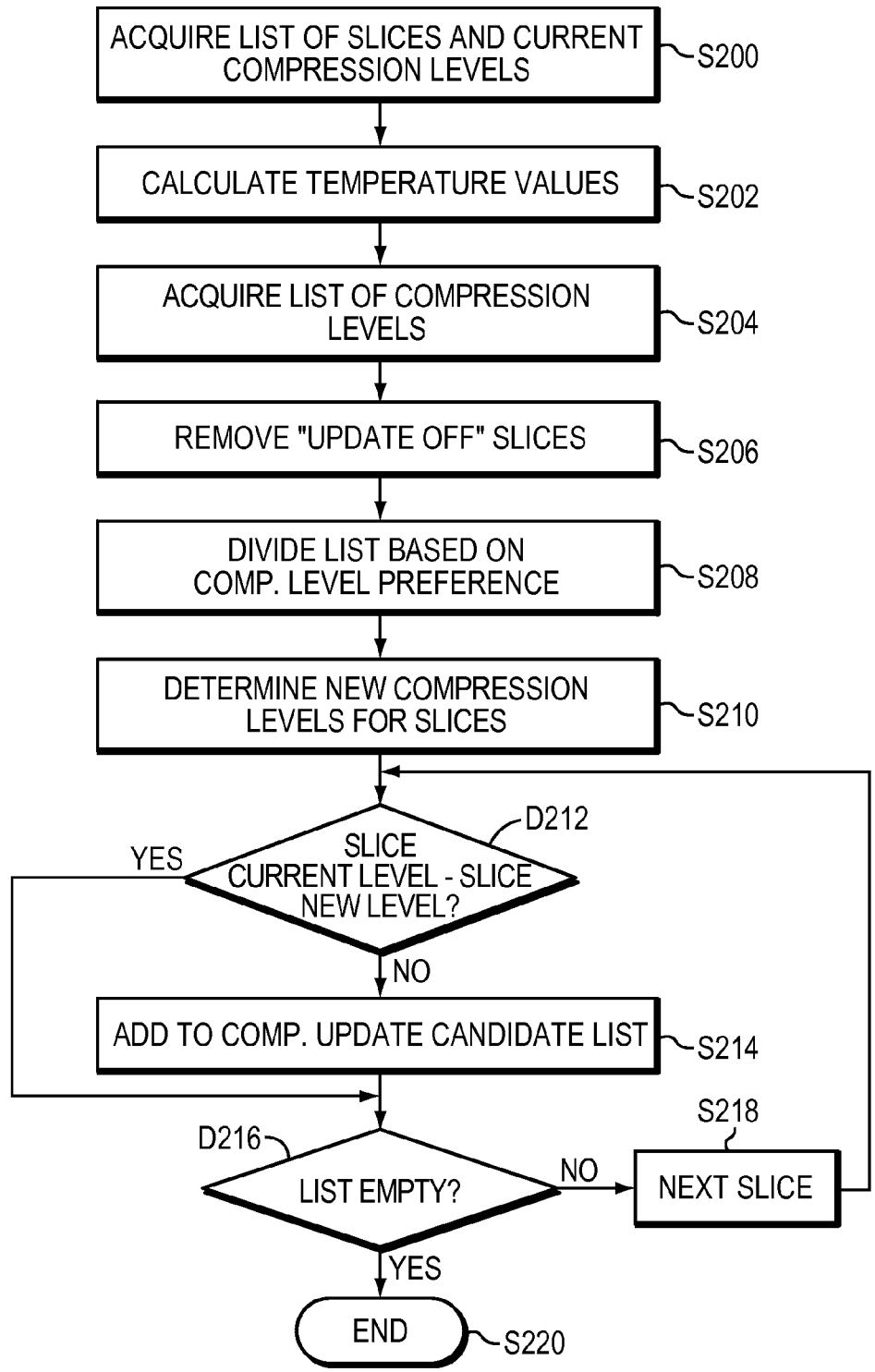

FIG. 6 illustrates a flowchart of one exemplary process for generating a candidate list in accordance with step S102 of FIG. 5. The candidate list can be generated based on the configuration of the storage pool and the temperatures of the various slices within the storage pool. In step S200, a raw list L of all slices in a storage pool is acquired along with various properties of each slice, for example by polling the various storage processors or storage devices that make up the storage pool. The method can also include a step S202 in which the temperature of each slice in the raw list L is determined and/or calculated.

To facilitate efficient and/or optimal compression level updating, it can be desirable to quantify the "temperature" of a given block, slice, unit, or other grouping of data. The temperature of data can be indicative of a variety of factors, including for example the frequency and/or recency with which input or output requests relating to the data are issued or received. Data temperature can be an instantaneous measurement or can reflect a historical or long-term trend of a slice's "hotness" or "coldness," and can be used to predict the I/O access pattern of a given slice in the near future. One method of determining the temperature of a slice of data is to use an exponential moving average (EMV). In such embodiments, various metrics such as total I/O counts, block counts, and I/O response time are collected initially for each slice and then sampled periodically thereafter. A slice temperature and an EMV of slice temperatures can be calculated for each sampling period and the slice temperature value in the raw list L can be updated accordingly. The collection and calculation of slice temperature data can be performed by a user-space application running on a storage processor, a storage system management station, a host server, and/or on a client machine.

EMV-type processes can have a low computation cost, since only the current I/O activity and the latest temperature values are needed when updating temperature values for each slice. EMV processes can also incorporate a smoothing factor to reduce statistical measurement jitters in each sampling period. For example, a smoothing factor can be used to give more weight to more recent I/O activity history and less weight to older I/O activity history. The smoothing factor can be adjusted to improve the prediction accuracy of the temperature calculation by reducing jitters.

As noted above, the I/O activity of a slice of data during a given period can be useful in calculating a slice temperature. The I/O activity of a slice can be calculated in a variety of ways, including using raw slice access statistics, and the specific technique can depend on a variety of factors, including for example the I/O traffic pattern of the system. In one embodiment, the I/O activity of a slice can be represented simply by the total I/O counts of the slice. In this case, I/O activity during a given period will simply equal the number of I/O requests received in the relevant period that address data stored in the slice. The slice temperature will be a moving average of the slice I/O access rate and will thus reflect how often data in the slice is accessed. This way of representing slice I/O activity can be desirable in applications in which the storage system is used to store large databases in which the number of input and output operations that can be processed in one second (IOPS) is the most important performance metric for a user and where a high cache hit ratio is not expected. In other applications in which there is a heterogeneous workload environment where cache hit ratio or I/O block size differs significantly, alternative representations can be more desirable.

Another way of representing the I/O activity of a slice of data during a given period is to use the normalized total response time of the slice. For many users, improving response time is one of the most important aspects of storage system performance optimization, since many users measure I/O response time as the ultimate performance indicator. In addition, response time can advantageously reflect and/or capture the compound effects of many different variables, including for example system load, I/O traffic pattern (random vs. sequential), I/O block size, cache hit ratio, RAID configuration, etc. Accordingly, using response time can eliminate the need to consider these factors independently. One additional factor that does need to be accounted for, however, is that I/O response times from different storage tiers can differ considerably, since tiers can have vastly different underlying performance capabilities. For example, the I/O response time of a solid state drive (also referred to as enterprise flash drive (EFD)) might be as much as 30 times faster than that of a Fibre Channel (FC) drive. Thus, it is possible that the total response time of a slice that is stored on an EFD drive or drives will be much faster than that of a slice stored on an FC drive or drives, and yet the EFD slice may service many more I/O requests than the FC slice. To yield a meaningful comparison between these response time figures, it is necessary to take into account the underlying performance capability of the storage tier or device on which the slice is stored to arrive at a normalized slice total response time.

One method of normalizing response time values for a given slice is to estimate the performance capability of the RAID group (RG) or groups to which the slice belongs.

Another way of normalizing response time values for a given slice is to factor in the average response time of the RAID group in which the slice resides.

Additional information on slice temperature calculation can be found in U.S. patent application Ser. No. 12/640,254, entitled "A METHOD FOR COMPUTING STORAGE DATA TEMPERATURE BASED ON STORAGE LOAD", filed 17 Dec. 2009 which application is hereby incorporated herein in its entirety.

Once a temperature is computed for each slice, it can be used to predict future slice I/O activity and to help determine optimal selection among compression levels having differing performance characteristics. In at least some implementations, before slices are actually updated with new compression levels, it can be desirable to decide the best compression level for each slice in the storage pool. Accordingly, the method of FIG. 6 for generating the candidate list can also include determining a new compression level for each slice in the raw list L.

First, in step S204, a compression level list is acquired or constructed of all compression levels within the storage pool. Various attributes can be determined and/or tracked using counters for each level in the list T, including for example the number of used slices having the compression level and the compression level's "capacity limit" (as described below). The number of used slices is the number of slices that are presently storing user data. Maintaining a certain amount of slices at each compression level can permit more efficient initial compression levels of slices at allocation time, as a user's first choice of compression level for a new slice will always be available. The capacity limit of a compression level is the maximum number of slices that can have the level. This can be useful to help enforce policies for a desired balance of I/O performance and storage space in the array. For example, a policy may dictate that a third of all slices be uncompressed, a third have fast compression, and a third have slow compression, so that the array has an acceptable moderate level of performance as well as an acceptable moderate level of storage usage growth. In another example, another policy may dictate that the uncompressed level have a high capacity limit so that almost all of the slices are uncompressed, for emphasis on high performance.

Once a list T of all compression levels is constructed, the raw list L of all slices in a storage pool can be narrowed to the candidate list. As noted above, the list L generally contains an entry for each slice that includes various information about the slice. In one embodiment, the list L includes, for each slice in the storage pool, the slice's temperature and the slice's compression level preference. The compression level preference of a slice is a value that can be set by a user or can be set automatically by storage system management software. The slice compression level preference can also be derived from the properties of the compression level with which the slice is allocated. Possible values for the compression level preference can include "update off," indicating that the slice's compression level should never be updated, "uncompressed preference," indicating that the slice should be left uncompressed whenever possible, "slow compression preference," indicating that the slice should be compressed using slow compression whenever possible, or "optimal," indicating that the slice has no particular preference and thus should be placed at the highest-performing compression level that is appropriate.

To narrow the raw list L down to a list of candidate slices, all slices with an "update off" compression level preference can be removed from the list in step S206. As such slices are removed from the list, the capacity limit counter for the level to which the slice was updated can be decremented. The raw list L can then be split in step S208 into three separate lists L1, L2, L3 based on compression level preference such that L1 lists all slices with an "uncompressed preference," L2 lists all slices with a "slow compression preference," and L3 lists all slices with an "optimal" preference.

In subsequent step S210, the slices in the lists L1, L2, and L3 can be "distributed" to the various compression levels in the list T. Slices in the list L1 (slices having an "uncompressed preference") can be distributed to the uncompressed level of storage in order of slice temperature. Thus, the hottest slices in the list L1 will be distributed first. As each slice is distributed to a level in the list T, the capacity limit counter for that level is decremented by one. If slices can no longer be distributed to the uncompressed level which is the highest-performing compression level (e.g., because the level is "full," meaning its capacity limit counter is zero), the remaining slices in the list L1 are distributed to the fast compression level which is the next-highest-performing compression level. The process continues until all slices in the list L1 are distributed to a compression level.

Slices in the list L2 (slices having a "slow compression preference") can be distributed to the slow compression level in reverse order of slice temperature. Thus, the coldest slices in the list L2 will be distributed first. Again, as each slice is distributed to a level, the level's capacity limit counter is decremented by one. If slices can no longer be distributed to the lowest-performing level (e.g., because the level is "full," meaning its capacity limit counter is zero), the remaining slices in the list L2 are distributed to the fast compression level which is the next-lowest-performing level. The process continues until all slices in the list L2 are distributed to a compression level.

After all the slices in the lists L1, L2 are distributed, the slices in the list L3 (slices having an "optimal" preference) can be distributed to the remaining compression levels, starting with the uncompressed level. The slices in the list L3 can be distributed in order of slice temperature such that the hottest slices in the list L3 are be distributed first. Again, as each slice is distributed to a level, the level capacity limit counter is decremented by one. If slices can no longer be distributed to the specified level (e.g., because the level is "full," meaning its capacity limit counter is zero), the remaining slices in the list L3 are distributed to the next-highest-performing, non-full level. The process continues until all slices in the list L3 are distributed to a compression level.

A candidate list can be generated once all the slices in the lists L1, L2, and L3 are distributed to a compression level.

When a slice is "distributed" to a compression level, it only means that a logical association is formed between the slice and the level, not that the data represented by the slice has actually been compressed or uncompressed to match the level as the case may be. For each slice in the lists L1, L2, L3, the slice's current compression level (the compression level which the data represented by the slice presently uses) is compared with the slice's new compression level (the level to which the slice has been distributed) in decision block D212. If a slice's current level differs from its new level, the slice is added to the candidate list at step S214 and removed from the list L1, L2, or L3. Otherwise, the slice is removed from the list L1, L2, or L3 without being added to the candidate list. If it is determined at decision block D216 that slices remain in the lists L1, L2, L3, then the next slice is selected at step S218 and evaluated at decision block D212. The process repeats until step S220, which is reached when no slices remain in the lists L1, L2, L3.

A single "master" candidate list can be maintained and/or a separate candidate lists can be maintained for each compression level in the storage pool. Summary reports, charts, graphs, tables, etc. can be displayed to the user at various points in the list generation process to indicate progress and/or to provide the user with information to make a decision as to whether slice compression level update is desirable.

Once the slice candidate list has been generated in step S102 of FIG. 5, it can be divided into separate "LUN candidate lists" for each logical unit in the storage pool in step S104. As will be apparent from the description below, division of the candidate list by logical unit can ensure that only one slice from any given logical unit is queued for compression level update at any given time. This can desirably permit such update to be performed without substantially interrupting user access to the data represented by the slices being updated.

FIG. 7 shows one embodiment of a candidate list before division. The illustrated list is an example of one that might be generated for a storage pool having three compression levels (UC being the highest performing) and N logical units, each logical unit comprising 100 slices. A person having ordinary skill in the art will appreciate that a logical unit can have a virtually unlimited number of slices and that a storage pool can have a virtually limitless number of compression levels. In the illustrated embodiment, as noted briefly above, each slice is represented by a slice identifier comprising two integers separated by an underscore. The first integer indicates the logical unit (LUN) to which the slice belongs and the second integer represents a unique slice designator. For example, the first entry in the illustrated list has the slice identifier 0_08, which in this embodiment indicates that the slice is the eighth slice in logical unit zero. In the illustrated embodiment, the slice temperature is an integer between 0 and 99, with 0 being the coldest possible temperature and 99 being the hottest. A skilled artisan will appreciate that this format for slice temperature is selected only for simplicity of illustration, and that much finer or coarser definition of slice temperature can be achieved, for example by using a floating point value or by narrowing or expanding the upper and lower bounds.

As shown, each slice in the candidate list has a current compression level and a new compression level which differ from one another. The data represented by slice 0_08 for example is currently compressed using slow compression. Since slice 0_08 is a relatively "hot" slice (as indicated by its temperature value of 97), it has been determined by the candidate list generation process that slice 0_08 should be uncompressed. As another example, the ninety-third slice in logical unit N (slice N_93) is relatively cold, as indicated by its temperature value of only 21. Since this slice is presently uncompressed, it has been determined that using slow compression with this slice would improve the perceived performance of the system.

FIG. 8 shows the candidate list of FIG. 7 after having been divided in step S104 of FIG. 5 into multiple logical unit candidate lists. As shown, a separate logical unit candidate list has been generated for each logical unit 0-N. In addition, the lists for each logical unit have been sorted in order of slice temperature, with the hottest slices appearing first in the list.

In step S106 of FIG. 5, the hottest slice in each of the logical unit candidate lists is added to an execution list E and removed from the logical unit candidate lists. In certain cases however, it can be desirable to move a different slice from each of the divided logical unit candidate lists to the execution list E, as will be discussed below with respect to step S108.

In step S108 of FIG. 5, a compression sublevel within the compression level of each slice in the execution list E can optionally be selected. Selecting a specific sublevel can allow for more precise and granular compression of data. In selecting a sublevel within a level, it can be desirable to maintain a balanced load distribution amongst the constituent sublevels In step S110, the execution list is sorted in order of expected performance gain. FIG. 9 illustrates an execution list E generated from the divided logical unit candidate lists of FIG. 8 as well the updated divided lists themselves. As shown, the execution list E includes the hottest slice from each of the several divided lists, and includes a new compression level for each slice. In addition, the execution list E is sorted in order of expected performance gain. For example, even though the temperature value of slice 1_75 (temperature=99) is slightly higher than that of slice 0_08 (temperature=97), slice 0_08 appears first in the execution list because it has the greatest expected performance gain. This is due in part to the fact that slice 0_08 is presently using slow compression. Changing this slice's level from slow compression to uncompressed will have a greater expected performance gain than changing the level of the slice 1_75 from fast compression (which is already relatively fast) to uncompressed. Determining the expected performance gain for a given update will also depend on the method used to calculate the slice temperature and/or any normalization that may be required, as explained above. In one embodiment, comparison of the current throughput is compared to the throughput of the new compression level. Prioritizing the execution list in such a way ensures that the greatest or nearly greatest possible performance gain is achieved, particularly when a user places constraints on the number of updates that can be performed or on the amount of time that can be spent on updates.

Having generated and sorted an execution list, the actual physical compression level updating of the data corresponding to each slice can be performed, beginning with step S112. In one embodiment, the updating is performed by instructing compression logic 370 of one or more of the storage processors in the storage pool to carry out the updating. For example, the kernel can be instructed to decompress (if necessary) the data corresponding to the slice to be updated and compress it (if necessary) at its new compression level. The kernel can be polled for status and, when the data is successfully updated, the slice can be removed from the execution list and any physical locations that have been freed up by the compression can be marked as free space. The freed up locations can also be marked free as soon as the data contained therein is copied into memory. The freed up locations can also optionally be actively cleared by storing "dummy" data patterns to prevent a malicious user from later recovering the data that was once stored there.

After the first slice in the execution list has been updated, a termination event is checked for at decision block D114. There are a variety of possible termination events that should trigger a stop in the slice update processing. For example, if all slices in the candidate list are optimally updated, if a user-specified maximum number of slices to update has been reached, or if a user-defined window within which to perform slice calculation has elapsed, slice updating can cease. Other conditions can also trigger a stoppage of update processing, for example if I/O load on the storage pool becomes unexpectedly high, if a hardware failure occurs such that the system is no longer running in a high-availability (HA) mode, if a user presses a cancel or abort button, or if certain power-saving profiles are selected by the user. Upon occurrence of a termination event, the updating process ends at step S118. Otherwise, the execution list is checked D116 for remaining entries. If the execution list is non-empty, the method resumes execution at step S110 and the execution list E is again sorted by expected performance gain and the new first slice is updated. If the execution list is empty, but a termination event has yet to occur, the method resumes execution at step S104 and additional candidates can be updated.

In one embodiment, a storage system is provided for performing the various methods and techniques disclosed herein. The storage system can include a physical storage pool having available multiple compression levels of differing performance capabilities or characteristics and that are mapped into one or more logical units, each logical unit including one or more logical slices. The system can also include a processor coupled to memory and in communication with the physical storage pool. Examples of such configurations can include one or more storage processors, management workstations, client machines, and/or a host servers, as shown for example in FIG. 11 and described above.

Figure 11:
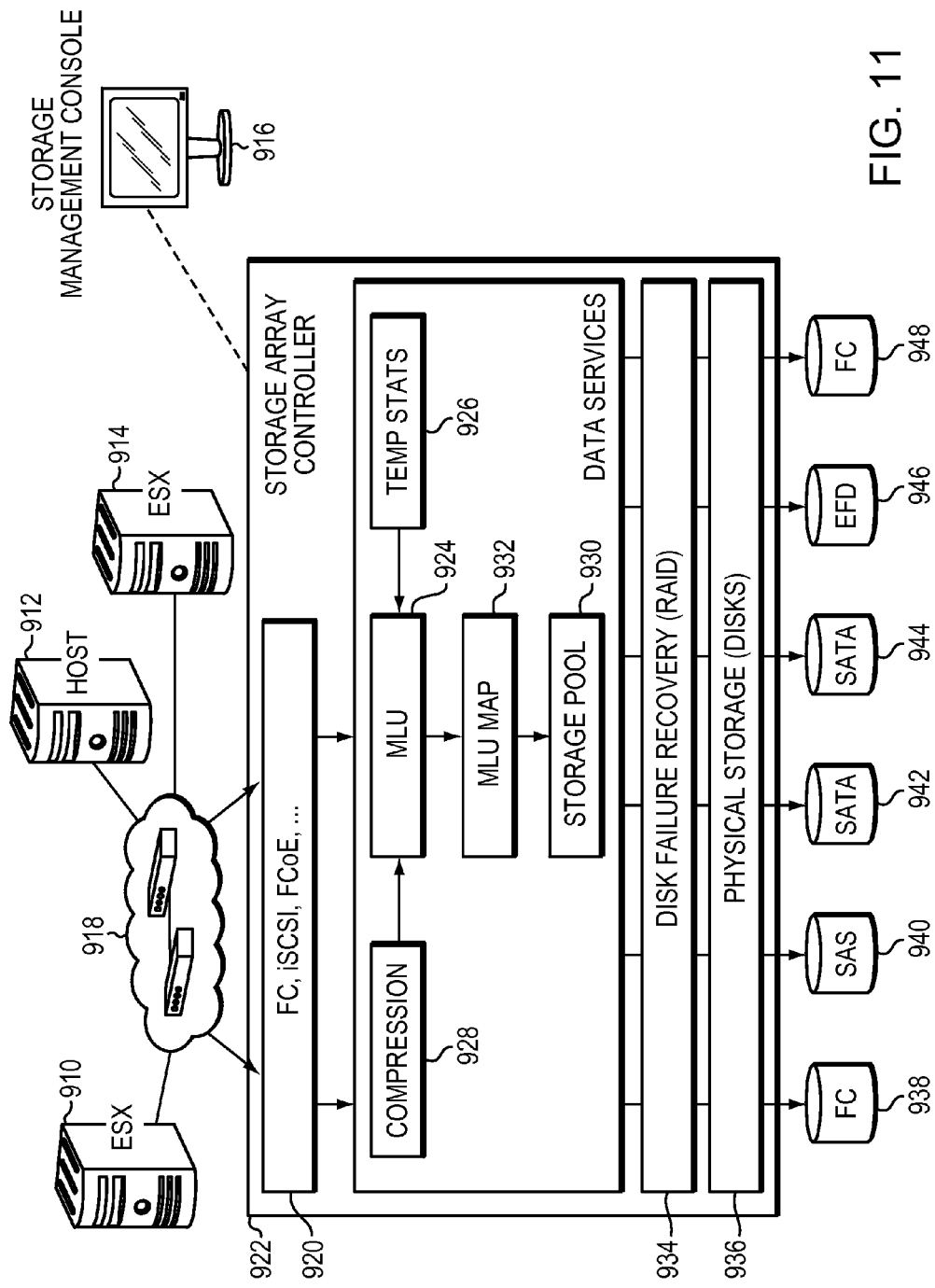
Figure 12:
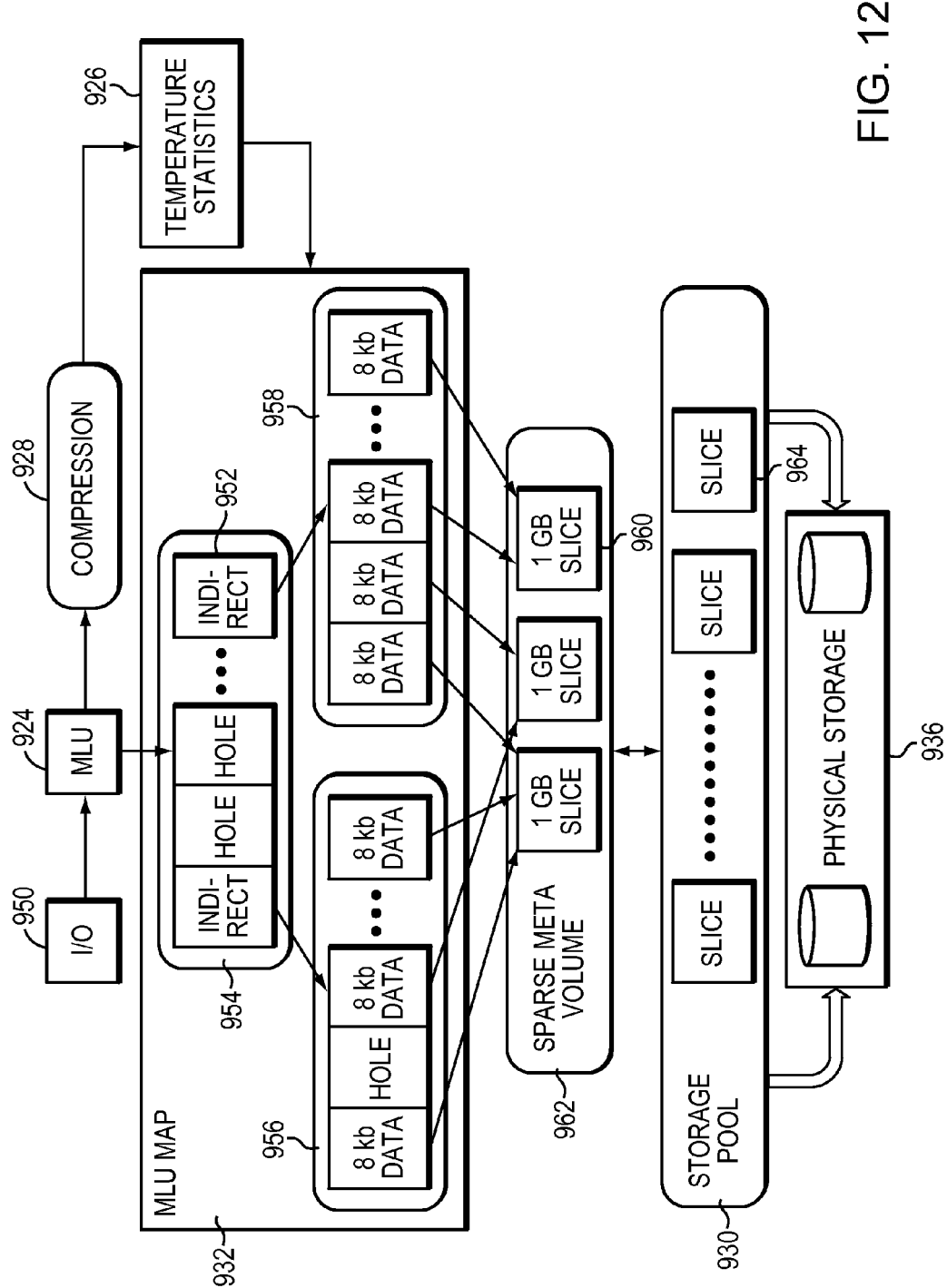

With reference now to FIGS. 11-16, now described are further details and an example of a preferred embodiment of at least some aspects of the technique described herein. FIG. 11 provides an overall diagram of an enhanced data storage system and environment. The technique may be incorporated into such system in any of a variety of ways. With respect to external connections, such system may have any I/O connection (e.g., Fibre Channel (FC), SAS, or iSCSI) to host systems (e.g., server 912) and/or virtual environments (e.g., ESX servers 910, 914) by way of direct connect or data communications switches 918. The storage system can be managed by way of a management console 916 that allows the administrator to monitor and control operation of the storage system. The storage system connects with physical disks such as Fibre Channel 938, 948, Serial Attach SCSI 940, Serial ATA 942, 944, or EFD 946 drives. The storage system uses the physical disks to persistently store data for the host systems.

With respect to storage system components, the storage system has a number of internal components including a storage array controller 922. With reference now to both FIG. 11 and FIG. 12, which illustrates an MLU map 932 with other components, one component 920 handles connections (e.g., FC or iSCSI) with host systems and passes I/O 950, i.e., read or write requests, to a Mapped Logical Unit (MLU) component 924. The MLU provides the abstraction of a LUN to the host systems. As described below, the MLU makes use of the MLU map that identifies where the data is stored.

In at least some implementations, for compression to be effective, the MLU Map allows mapping of small units of data called slivers. A sliver is a fixed number of contiguous bytes that is addressed by a pointer in an indirect block (e.g., block 952) of the MLU map. A sliver can be 2 kb-64 kb or in some implementations can use even larger sliver sizes, with 8 kb being a common size. The MLU map identifies locations where slivers as stored as offsets into larger slice objects which are abstractions provided by underlying components.

The storage system provides a mechanism 934 to help handle the failure of a physical storage 936 (e.g., disks) by using RAID algorithms to build logical abstractions of storage from physical disks. Such mechanisms provide for continued access to such logical abstractions even when a disk has failed and the system is mitigating the failure with the RAID algorithms. The logical abstraction presented by the RAID algorithms can be structured into uniform size units called slices (e.g., slice 964) with all the slices on a set of disks considered to be a storage pool (e.g., pool 930). The storage pool is thus an abstraction of RAID protected uniform size objects called slices. Each slice is an allocation unit of space for an MLU that contains a significant number of slivers; slices can contain 100s to 10,000,000s of slivers with the layout of the data structures of the particular implementation determining the details.

The set of slices in the storage pool that are allocated for use for a particular user LUN is called a sparse meta volume (e.g., volume 962). When a MLU needs additional space, the MLU asks the storage pool to allocate another slice (e.g., slice 960) from a free slice list and the MLU then adds the slice to the sparse meta volume for the MLU.

The MLU map is a multi level hierarchal directory of pointers to data. As the size of the data increases, the number of levels increases as well. The MLU uses the MLU map to look up where data has been saved. In at least some cases, the first levels (e.g., level 954) are indirect blocks (e.g., block 952) which identify other levels of the directory (e.g., levels 956, 958). Eventually the directory entries identify the lowest level of the indirect blocks which point to the actual location for the data. The directory indirect blocks identify where in a slice a data sliver has been stored. The MLU map also has a list of free slivers (e.g., list 968) in the slices that are allocated to the MLU.

Figure 13:
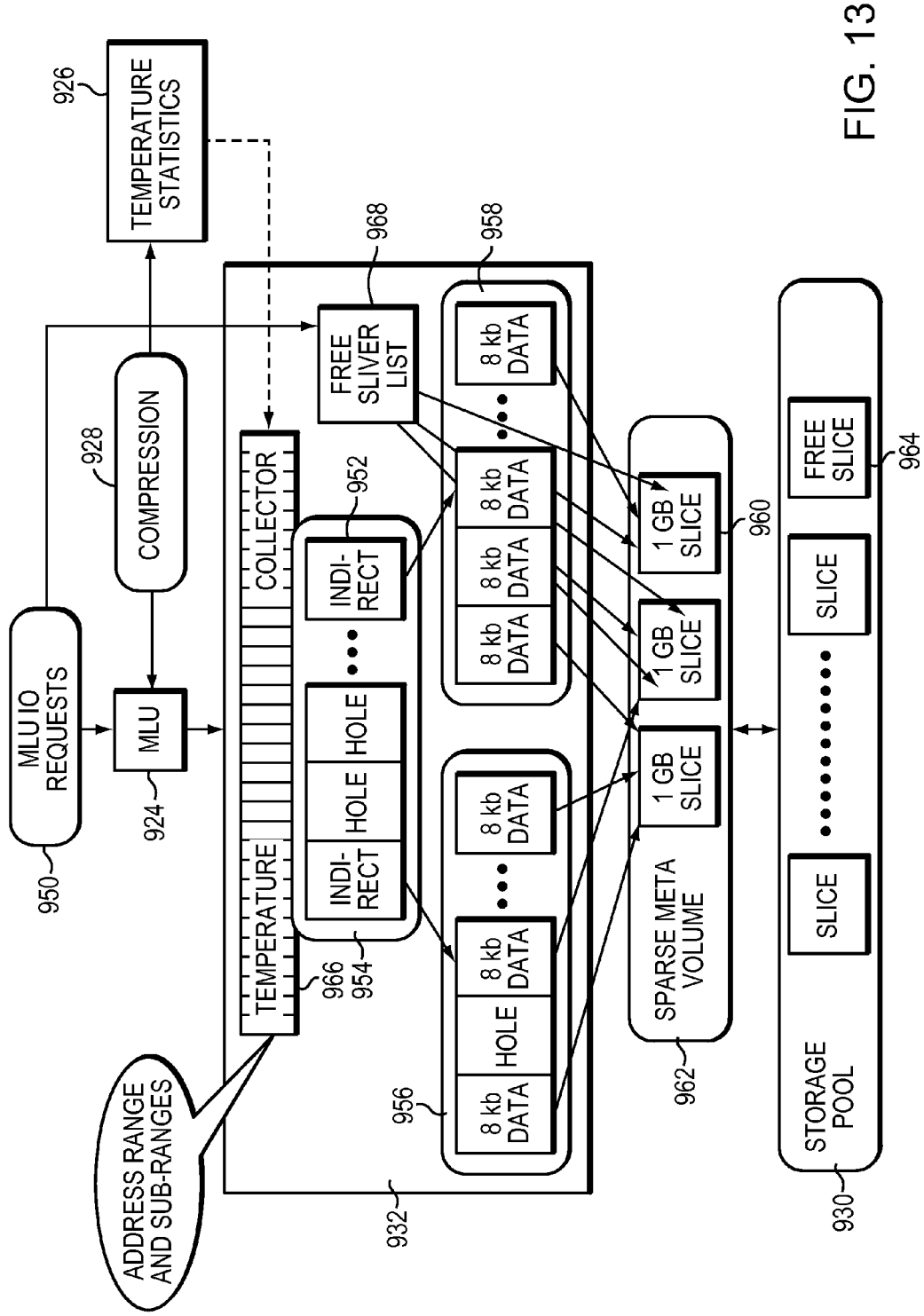
Figure 14:
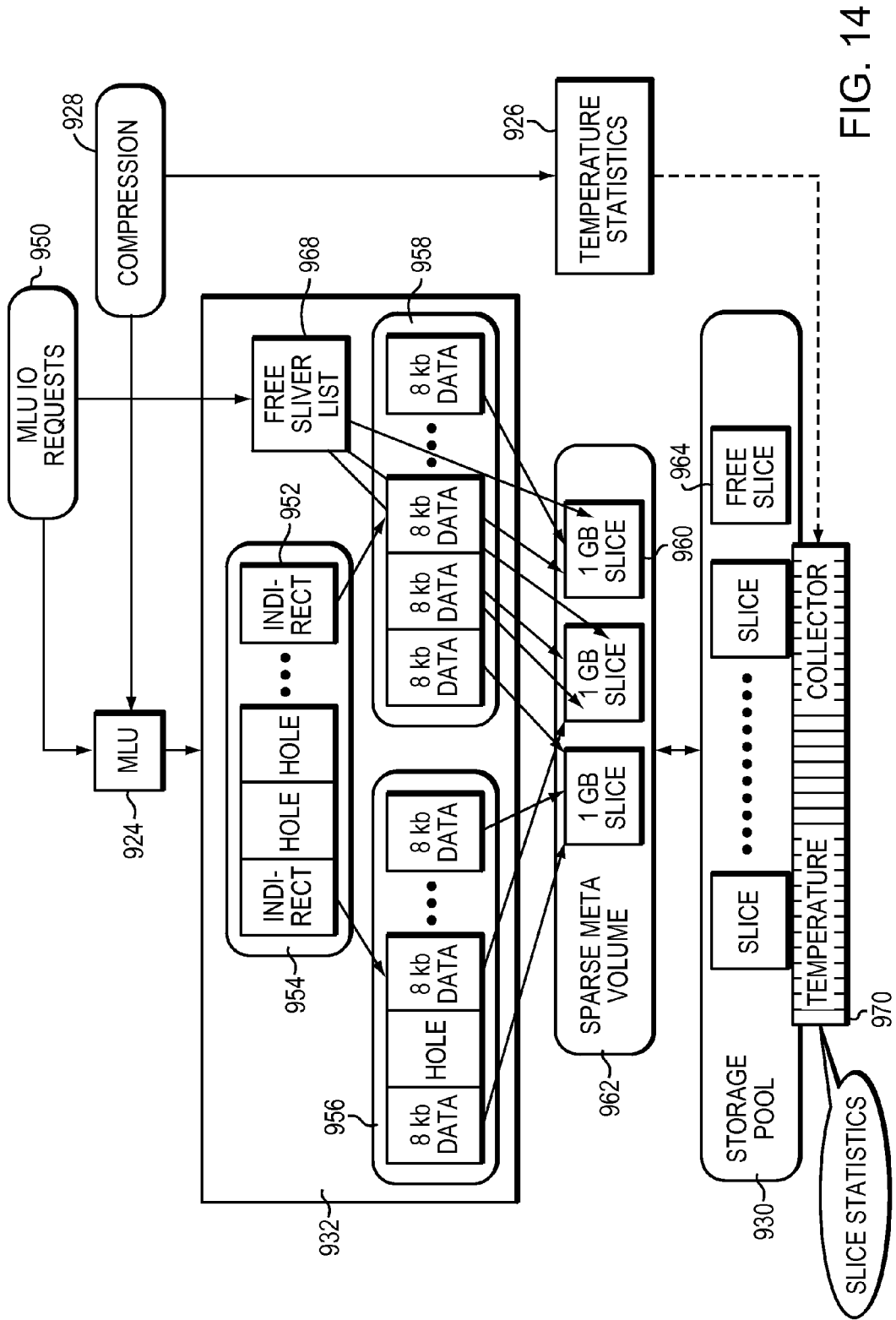
Figure 15:
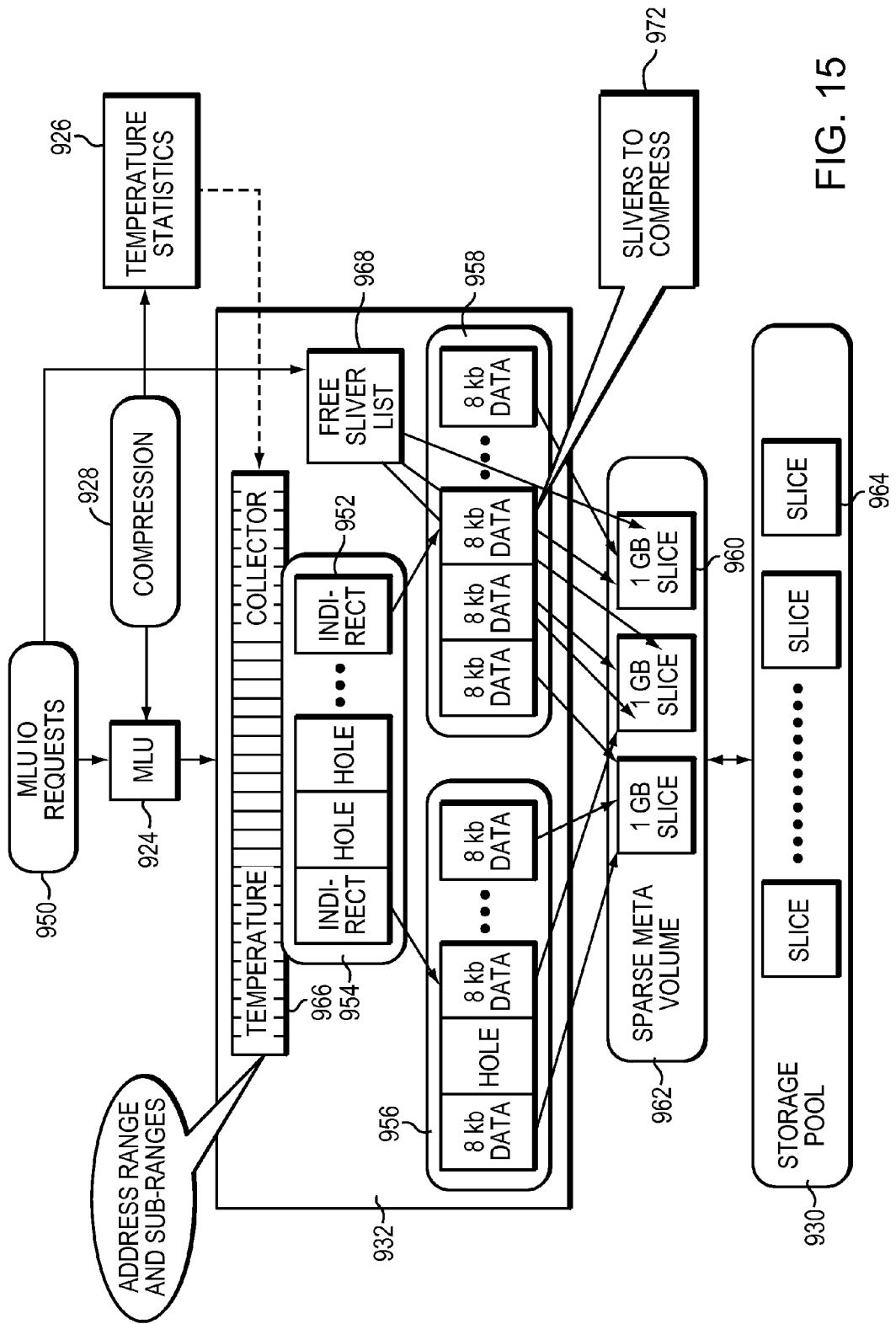
Figure 16:
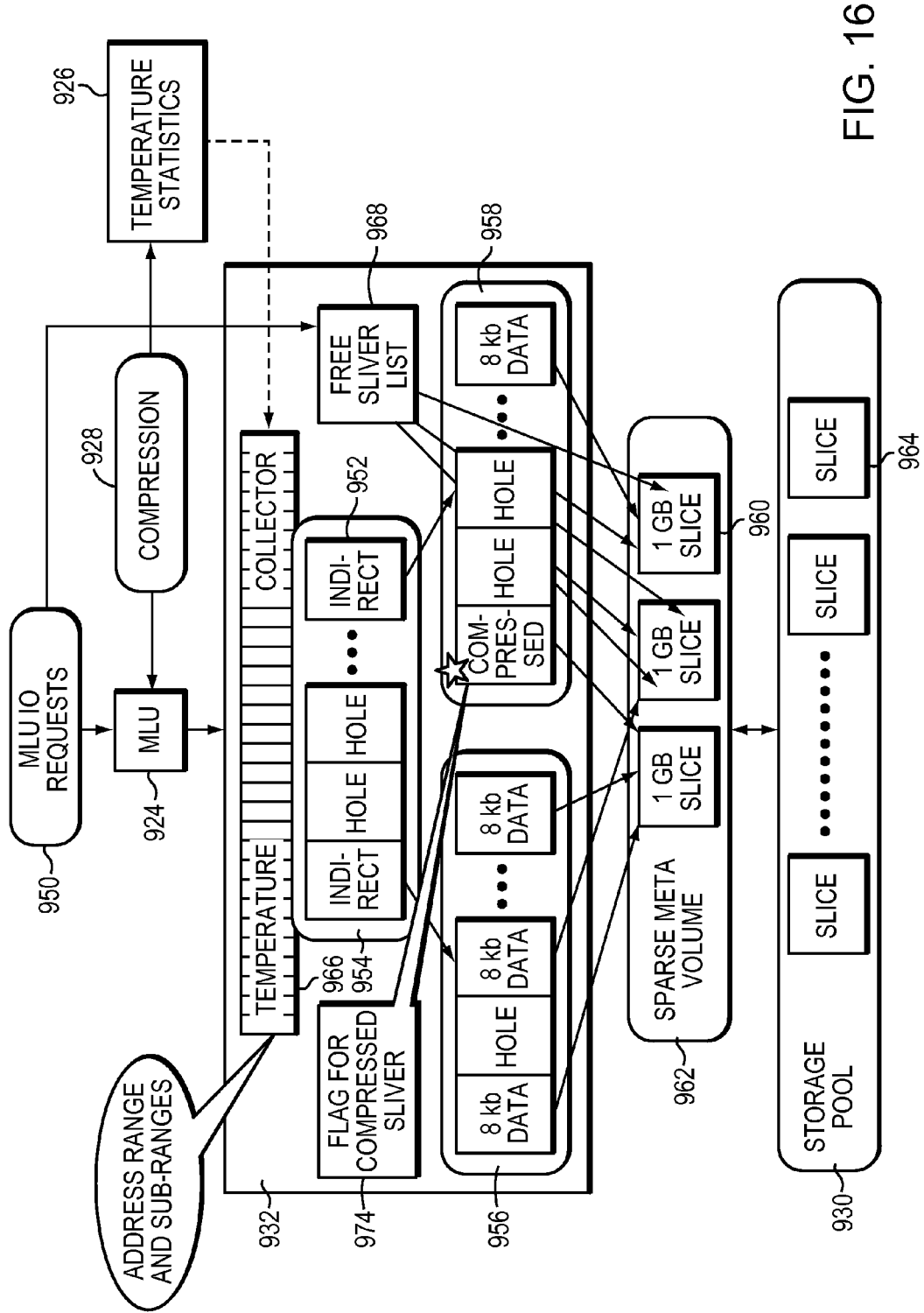

FIG. 13 illustrates detail of the MLU map with logical address level temperature collector 966 and free sliver list, FIG. 14 illustrates detail of the MLU map with slice level temperature collector 970 and free sliver list, FIG. 15 illustrates candidate slivers to be compressed, and FIG. 16 illustrates the MLU map after slivers are compressed.

With reference now to FIGS. 11-16, with respect to compression, a compression component 928 reviews the directory of the MLU map for multi-sliver sub-ranges that can be compressed. When a set of two or more slivers of data with contiguous logical addresses are found that can be compressed (e.g., set 972), one of the slivers of storage is rewritten with the compressed value and the other slivers are put on the free list. The pointers in the directory are also marked with a flag (e.g., flag 974) that indicates that the slivers have been compressed.

When the host system accesses a sliver that has been compressed, the flag in the directory corresponding to the logical address of the sliver in the LUN indicates that the data has been compressed, and the I/O request waits while the compressed data is read. If the I/O request is a read request the data can be uncompressed and returned to complete the request. If the I/O request is a write request, some slivers are removed from the free list and the uncompressed structure restored. Once the uncompressed structure has been restored, the host write request can be completed. In some implementations the system may do the same for the data for read requests if desired, but it is generally sufficient to uncompress the data and return it on each read request without restoring the uncompressed structure.

With respect to temperature statistics, a temperature statistics component 926 can track the references to the data either by tracking the logical addresses the host references in the MLU or by tracking the underlying slices and, optionally, some slivers. Tracking at the slice level requires a translation to the logical level but may facilitate sharing of the results by other components of the system. Tracking at the logical address level maybe more directly applicable for compression.

If statistics are tracked at the logical address level, the address range of the MLU is divided into a number of sub-ranges. The number depends on the configuration of the system and both the number and the size of the sub-ranges can be dynamic. Each time an I/O references slivers in a given sub-range, the statistics associated with that sub-range will record the reference. As a particular sub-range records more activity, it may in turn be sub-divided into smaller sub-ranges. If a sub-range is subdivided, it may be necessary to find some other sub-ranges that are no longer receiving lots of references to be re-combined to free up space to hold the statistics for range being sub-divided. This mechanism records statistics over the range of the logical address with more details captured about those parts of the range that experience more activity. This yields a logical address temperature map that can be used to give an ordering of addresses for compression activities.

If the statistics are tracked at the underlying slice level, each slice has statistics about its level of activity. Some of the slivers in the slice may also have their own individual statistics for those slivers that are particularly active. (Additional information on such individual statistics and related information can be found in U.S. patent application Ser. No. 12/494,622, entitled "FACILITATING DATA MIGRATION BETWEEN TIERS", filed Jun. 30, 2009 which application is hereby incorporated herein in its entirety.)

However before the statistics at the slice level can be used, the system constructs the logical address temperature map from the temperatures recorded at the slices. When the logical address temperature map is needed, the system walks the logical address space and for each logical sliver address, determines which physical slice holds that sliver and puts the temperature for that slice into the logical address temperature map. If the sliver itself is tracked, such sliver temperature is used rather than the containing slice temperature. Once all the logical addresses of the logical address range have been considered, the logical address temperature map is complete.

With respect to ordered compression the logical address temperature map can be queried to determine the order of addresses in an MLU ranked by temperature. The logical address temperature map can return the hottest or coldest address in the logical address range. For any given address, the temperature statistics manager can identify the next coldest or next hottest addresses in the logical address temperature map. If some of the logical addresses are the same temperature, they can be returned in arbitrary or other arbitrary order as desired by the implementation.

This allows the compression component to call the temperature statistics component to get the coldest address and then work through all the addresses from coldest to hottest compressing compressible data. As long as the temperature or amount of data checked is less than the cut off threshold, the process continues. Once the temperature of the data being checked exceeds the threshold or cut off temperature, the compression search terminates.

The compression component attempts to replace a sequence of slivers with a sliver of compressed data and the flag that indicate the slivers have been compressed. When the compression component does find a sequence of slivers that can be compressed, it returns slivers to the free space for the MLU. The MLU may eventually accumulate enough free slivers that it can consolidate (move) data to free up a slice and return the slice to the free slice list and thus make space available for other LUNs.

With respect to unordered compression, the ordered compression described above compresses the data in the logical unit starting with the coldest working up to the cut off temperature, so that the least referenced data is compressed first. It is also possible to do an unordered compression that may require fewer system memory resources.

For unordered compression, the temperature statistics can be collected at either the logical or physical level. Before compression, the statistics are analyzed to determine the cut off temperature. The analysis may compute the average and standard deviation for the temperatures and use the average temperature plus a multiple (possibly a fractional multiple) of the standard deviation to create the cut off temperature. The multiple of the standard deviation depends on the amount of the data desired to be compressed. An alternative for determining the cut off temperature may sort the temperatures and then search for the temperature that divides the statistics in to two parts with the desired ratio of sizes.

Once the cut off temperature has been determined, the compression component can examine the data in the logical unit in any order. For each sliver of data, the compression component can get the temperature of the data and compare it with the cut off temperature. If the sliver temperature is less than the cut off temperature, the sliver would be compressed. If the sliver temperature is more than the cut off temperature, the sliver would not be compressed.

Since unordered compression does not construct the logical address temperature map, it may require fewer resources to implement. However since it does not start with the coldest data, it may compress the data in a less than optimal order. If the compression process does not complete due to time limitations or other interruptions, some of the data that was compressed is more likely to be uncompressed to satisfy a host I/O request than would have resulted from the ordered compression.

With respect to management, console 916 allows the administrator to query array operation and set control parameters. The administrator can turn compression on or off for a LUN, can control when the system attempts to compress the data in a LUN, and can adjust or override the cut off temperature for what data to compress in the LUN (e.g., as shown in FIG. 10).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing compression in data storage systems, the method comprising:
    determining a first data temperature for sub logical unit extents in a block-based data storage system, wherein the block-based data storage system comprises at least one logical unit including sub logical unit extents;
    based on the first data temperature, determining a first compression level for the sub logical unit extents using cut off temperatures for separating different compression levels, the compression levels comprising an uncompressed level, a fast compression level and a slow compression level, wherein the fast compression level has a greater performance profile than the slow compression level and the uncompressed level has a greater performance profile than the fast compression level;

based on the first compression level, applying data compression to the sub logical unit extents;

determining a second data temperature for the sub logical unit extents;

generating a compression update candidate list, wherein the compression update candidate list includes an entry for each sub logical unit extent, further wherein the compression update candidate list comprises the second data temperature and a new second compression level for each sub logical unit extent in the list;

dividing the compression update candidate list into separate logical unit candidate lists for each logical unit;

adding the hottest sub logical unit extent in each of the logical unit candidate lists to an execution list; and updating the compression levels of each sub logical unit extent in the execution list in order of expected performance gain.

2. The method of claim 1, wherein the data temperature is derived from a level of data access activity from data utilization statistics.

3. The method of claim 1, wherein no compression is used for often accessed data and compression is used for infrequently accessed data.

4. The method of claim 1, wherein data access statistics on sub LUN extents are kept and used to rank data from most frequently accessed to less frequently accessed.

5. The method of claim 1, wherein a ranking of data from most frequently accessed to less frequently accessed is consulted and a compression process is used only with the less frequently accessed data.

6. The method of claim 1, wherein accesses to frequently accessed data are able to reference uncompressed data.

7. The method of claim 1, wherein the data of the block-based data storage system is subdivided into slices and a data temperature statistic is kept for each slice.

8. A system for use in managing compression in data storage systems, the system comprising:

a processor comprising a program logic for carrying out the steps of:

first logic determining a first data temperature for sub logical unit extents in a block-based data storage system, wherein the block-based data storage system comprises at least one logical unit including sub logical unit extents;

based on the first data temperature, second logic determining a first compression level for the sub logical unit extents using cut off temperatures for separating different compression levels, the compression levels comprising an uncompressed level, a fast compression level and a slow compression level, wherein the fast compression level has a greater performance profile than the slow compression level and the uncompressed level has a greater performance profile than the fast compression level;

based on the first compression level, third logic applying data compression to the sub logical unit extents;

fourth logic determining a second data temperature for the sub logical unit extents;

fifth logic generating a compression update candidate list, wherein the compression update candidate list includes an entry for each sub logical unit extent, further wherein the compression update candidate list comprises the second data temperature and a new second compression level for each sub logical unit extent in the list;

sixth logic dividing the compression update candidate list into separate logical unit candidate lists for each logical unit;

seventh logic adding the hottest sub logical unit extent in each of the logical unit candidate lists to an execution list; and eighth logic updating the compression levels of each sub logical unit extent in the execution list in order of expected performance gain.

9. The system of claim 8, wherein the data temperature is derived from a level of data access activity from data utilization statistics.

10. The system of claim 8, wherein no compression is used for often accessed data and compression is used for infrequently accessed data.

11. The system of claim 8, wherein data access statistics on sub LUN extents are kept and used to rank data from most frequently accessed to less frequently accessed.

12. The system of claim 8, wherein a ranking of data from most frequently accessed to less frequently accessed is consulted and a compression process is used only with the less frequently accessed data.

13. The system of claim 8, wherein accesses to frequently accessed data are able to reference uncompressed data.

14. The system of claim 8, wherein the data of the block-based data storage system is subdivided into slices and a data temperature statistic is kept for each slice.

* * * * *